United States Patent

[11] 3,625,406

[72] Inventor Rouel R. Campbell
3410 Club Drive, Apt. 6, Los Angeles, Calif. 90064
[21] Appl. No. 848,007
[22] Filed Aug. 6, 1969
[45] Patented Dec. 7, 1971

[54] MOTION PICTURE CAMERA AND THE LIKE
13 Claims, 23 Drawing Figs.
[52] U.S. Cl. .................................................... 226/52
[51] Int. Cl. .................................................... G03b 1/32
[50] Field of Search ........................................... 226/56, 55, 113, 114, 59; 352/184

[56] References Cited
UNITED STATES PATENTS
1,898,850 2/1933 Papo et al. .................. 226/113 UX
2,762,255 9/1956 Anderson .................... 226/114 X

*Primary Examiner*—Allen W. Knowles
*Attorney*—Schapp and Hatch

ABSTRACT: A motion picture camera of the type which advances the film through a film gate in stop and go motion comprising a film drive mechanism having a sprocket and two guide means for forming and guiding a loop of film through a film gate, one of the guide means being mounted on an eccentric for continuous rotation while moving the loop of film against a stationary registration pin in intermittent fashion and the other guide means cooperating with the first to prevent undue slack in the loop the camera is also constructed in two sections with one section containing the film and film guide means, and the other section containing power means, a shutter and an appropriate lens system; the film gate being characterized by having a zero clearance construction and remaining in substantially fixed relation to the lens mounting; and the film drive mechanism also being formed to drive through the sprocket and the film, with the film driving the supply reel and the supply reel driving the takeup reel through a clutch mechanism and gear system providing a continuously variable drive ratio.

INVENTOR.
ROUEL R. CAMPBELL
BY
Schapp & Hatch
ATTORNEYS

INVENTOR.
ROUEL R. CAMPBELL
BY
Schapp & Hatch
ATTORNEYS

INVENTOR.
ROUEL R. CAMPBELL
BY
Schapp & Hatch
ATTORNEYS

INVENTOR.
ROUEL R. CAMPBELL
BY
Schapp & Hatch
ATTORNEYS

INVENTOR.
ROUEL R. CAMPBELL
BY
Schapp & Hatch
ATTORNEYS

MOTION PICTURE CAMERA AND THE LIKE

BACKGROUND OF THE INVENTION

The present invention relates to improvements in a Motion picture camera and the like, and more particularly to a motion picture device adapted to move the film therethrough in intermittent stop-and-go motion and containing an improved film drive system for effecting such movement.

Heretofore, high-speed motion picture cameras in which the film is advanced intermittently, one frame at a time, have been beset by many difficulties and problems. One of the major problems with such high-speed picture cameras resides in the need for overcoming inertia as the film and associated parts are caused to accelerate between stop-and-go operations. This change of inertia not only causes the need for additional energy to be placed in the system, but also places a heavy strain on all of the moving parts. Accordingly, it is desirable to minimize the number of moving elements which undergo such rapid changes in velocity during the stop-and-go movement of the film through the film gate.

In addition, other operational areas of cameras of this type are constantly in need of further improvement, when possible, and these include the film drive mechanism whereby it is desirable to achieve high-speed operation with a minimum of power, and yet provide for proper synchronized movement of the irregular relationship between the supply reel and the takeup reel. Accordingly, it is desirable to utilize a minimum of moving parts in such drive, yet provide reliable operation, and facility of use, i.e. change of reels for use of the camera with multiple reels at one time.

Another problem that has arisen in motion picture cameras resides in the tendency of the film to bow somewhat so that a cylindrical concavity appears on the emulsion side of the film. It is therefore desirable to provide a film gate that tends to flatten out the film so as to provide a better focal plane at the film gate, yet which does not injure the emulsion or provide undue frictional drag as the film passes through the gate.

SUMMARY OF THE INVENTION

In accordance with the invention, an improved film drive mechanism is provided, which is especially suitable for motion picture cameras but also applicable to projectors. The film drive mechanism contains a sprocket means engaging the film traveling toward the film gate and engaging the film moving away from the film gate so as to provide a typical film loop on each side of the sprocket with the film loop going through the film gate. In this way, the film can travel at a substantially constant linear speed over the sprocket means and yet move in stop-and-go movement through the film gate by virtue of compensating movements in the loop itself. The sprocket means may contain a plurality of sprockets, but preferably a single sprocket is used, with the sprocket having suitable teeth for engaging the film on each side thereof and providing power to move the film toward and away from the film gate.

Instead of the typical claw system moving the film in the halting stop-and-go motion, this invention utilizes an eccentric guide for the film loop on one side of the film gate cooperating with a compensating guide for the film loop on the other side of the film gate so as to control the film loop and provide conversion from a constant linear movement of the film to a stop-and-go movement at the film gate.

At least one of the guides should be an eccentrically driven guide roller, and the other guide may be a matched eccentric guide roller, or a spring-mounted roller, or any other suitable guide capable of providing compensation with the main eccentrically mounted roller and maintaining the film loop in proper orientation. With this construction, the rollers are simply synchronized to the sprocket means so as to provide a relatively simple mechanism containing parts rotating in a substantially constant speed, yet providing the proper conversion of film travel from a substantially constant linear movement to a stop-and-go linear movement at the film gate and back to a substantially constant linear movement.

It is thus seen that a primary object of the present invention is to provide an improved film drive mechanism having a relatively simple construction for converting film movement from linear to the desired halting motion through the film gate and back to linear movement for rewind, said substantially constant velocity allowing for high-speed movement with a minimum of strain.

Another object of the invention is to provide a registration pin capable of cooperating with an eccentric drive for holding the film in a stationary position during exposure at the film gate, with the registration pin being constructed to function without movement thereof.

A further object of the invention is to provide a drive system of the character described, in which neither the supply reel nor the takeup reel is driven directly, but which have an interconnecting drive mechanism whereby driving force on one reel from positive driving action by the film or the like will provide proper driving speed of the other reel.

Still another object of the invention is to provide a film drive mechanism of the character described, which is capable of operating at relatively high speeds with a minimum of power input.

Preferably, the registration pin is mounted to the main frame so as to be stationary with respect to the camera, and the film drive mechanism is constructed so that the eccentric not only provides the stop-and-go movement of the film, but also moves the film into and out of engagement with the registration pin. With this construction, the registration pin does not have to move back and forth in reciprocating fashion as each frame passes as in the conventional registration pins, and the extreme forces due to the high acceleration of the pin are thereby avoided.

In the preferred camera constructed according to the present invention, the camera is also constructed into easily separable parts so that the motor drive, lens system and shutter may be provided in one part of the camera, and reel units together with their film drive mechanism may be provided in another section. This construction allows the operator to make rapid changes of film by utilizing the same main camera section with different spools of film already set up in driving relation. It is well known to facilitate reel changes, but heretofore the need of threading the film through the film guide means in the film gate has presented a problem. In accordance with the present invention, the film drive mechanism is completely provided in one portion, together with a portion of the film gate formed for cooperation with another portion of the film gate so that the change of film in no way changes the focus set by the objective lens nor the camera mount.

It is therefore still another object of the invention to provide a novel two-piece camera construction, in which the film drive mechanism is provided separately from the motor and shutter drive and associated parts, said two-piece construction being formed for accurate and rapid assembly with assured synchronization of the film drive mechanism and shutter mechanism.

Yet another object of the invention is the provision of a camera of the character described in which the film gate is formed from guide means providing a path having a width corresponding to the width of the film in the location of the aperture whereby the film is held in a flat configuration thereat, but without binding or excessive friction.

Further objects and advantages of the invention will be apparent as the specification progresses and the new and useful features of the motion picture camera and the like will be more fully defined in the claims attached hereto.

BRIEF DESCRIPTION OF THE DRAWINGS

The preferred forms of the invention are illustrated in the accompanying drawings forming a part of this specification, in which:

FIG. 12, a view similar to FIGS. 9 through 11, but illustrating a fourth film position, said four positions each representing a quarter turn of the eccentric guide of this invention so that the four FIGS. 9 through 12 illustrate a full cycle of operation of the film guide means herein;

While only the preferred forms of the invention are shown, it should be understood that various changes or modifications may be made within the scope of the claims attached hereto without departing from the spirit of the invention.

DETAILED DESCRIPTION OF PREFERRED EMBODIMENTS

Referring to the drawings in greater detail, there is shown in FIGS. 1 through 4 a typical movie camera 11 constructed according to the invention, said camera being formed with a door 12 and two main sections 13 and 14 which are capable of quick assembly and disassembly. Section 13 is formed with a main housing 16 adapted to provide a primary support and suitable for permanent mounting in aircraft or the like, when desired. This section 13 contains a suitable objective lens assembly 17 constructed to fit over an aperture 18 formed in housing 16, with the housing providing a portion of the film gate as will be shown hereinafter. The section 13 also contains a suitable motor 19 for providing power to the various moving parts, the motor 19 here shown being an electrical motor supplied through a typical appliance cord 21. As will become more apparent hereinafter, section 13 also contains a shutter 20 (see FIG. 5) synchronized to provide a speed dependent upon the speed of the motor, and a power-coupling means 22 for transmitting mechanical power from the section 13 to section 14.

The section 14 is formed with a housing 23 having an aperture or opening 24 formed to correspond with aperture 18 of housing 16, said apertures providing for exposure of the film at film gate 26. The section 14 also comprises a film drive means 27 adapted to receive power from the power-coupling means 22 and drive the film through the film gate in stop-and-go fashion.

The invention also provides means for preventing lengthwise movement of a strip of film 32 having a series of holes 37 along one side thereof while a picture is being taken, comprising a film drive means 27 and a registration pin 28 (see FIGS. 5 and 6) mounted on the housing for engagement with the holes of the film and for holding the film stationary when a hole is so engaged; said registration pin cooperating with said film drive means. The film drive means 27 comprises an eccentrically mounted wheel means 29 positioned for contacting the film strip and moving same laterally back and forth thereby causing the moving film to periodically engage and disengage the registration pin 28. This eccentrically mounted wheel means 29 operates by engaging a loop 31 of the film 32 formed by passing the film 32 over sprocket means 33.

As here shown, the sprocket means 33 consists of a single sprocket 34 having teeth 36 circumferentially spaced around the periphery for engaging holes 37 of film 32.

However, it will be appreciated that the sprocket means 33 could comprise multiple sprockets instead of a single sprocket so long as it feeds film toward loop 31 and takes film away from loop 31 at a substantially constant velocity. Loop 31 is formed by moving the film around guide roller 38, a compensating guide-and-wheel means 39, the eccentrically mounted wheel means 29 already mentioned, and guide roller 41, and back to sprocket means 33 (see FIG. 5). Other suitable guide rollers such as rollers 42 and 43 are provided in order to direct the film through a desired path and ensure engagement with the sprocket means.

Figure 13:
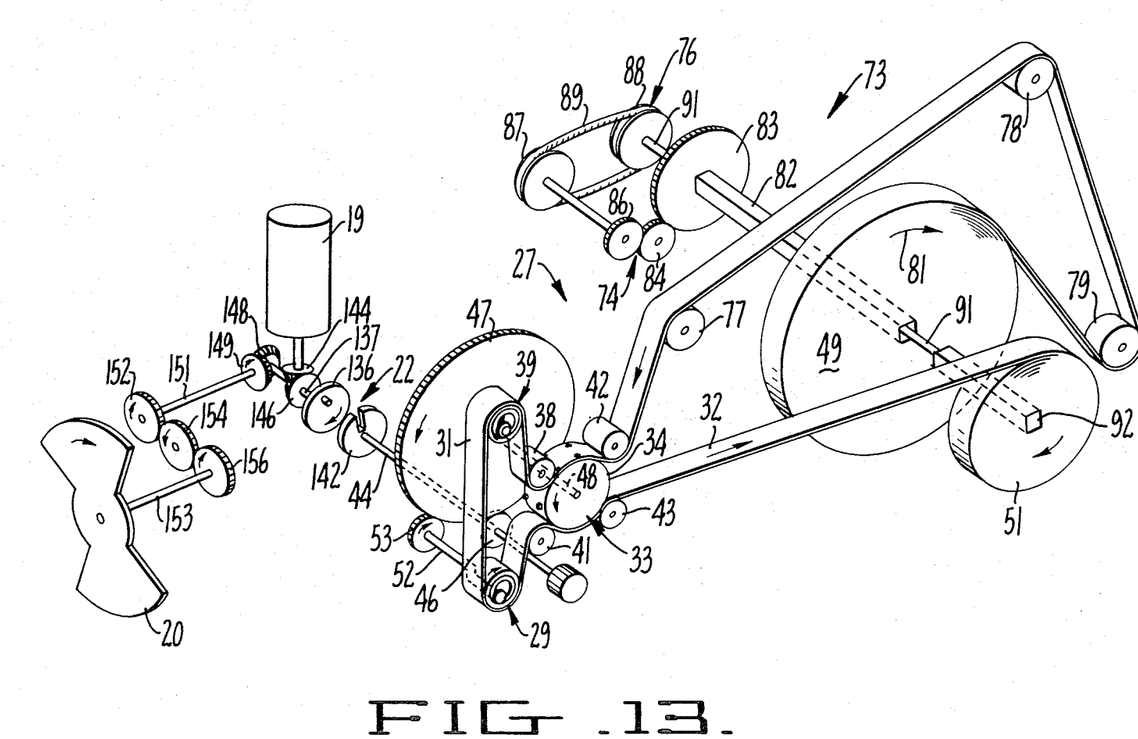
FIG. 13, a diagrammatic view of the overall drive mechanism of this invention illustrating how the various moving parts are synchronized together.

Referring more specifically to FIG. 13, it is seen that a shaft 44 receives power from coupling means 22, and this shaft 44 is part of and provides power for film drive means 27. Shaft 44 drives a gear 46, which in turn drives gear 47 carried on a shaft 48 on which is also mounted the sprocket 34 of sprocket means 32. The sprocket 34 then drives film 32 from a supply reel 49 and onto a takeup reel 51 in a manner which will be explained more fully hereinafter. Sprocket 34 also feeds film into the loop 31 at a substantially constant velocity, and takes up film from the loop at the exact same velocity, the exact length of the loop being fixed by the engagement of the sprocket with the filmstrip.

The movement of the section of the film loop passing through the film gate is regulated by the eccentrically mounted wheel means 29 and by the compensating guide-andwheel means 39, which are formed to provide stop-and-go motion of the section of the loop therebetween. In the form here shown, the eccentrically mounted wheel and 29 is positively driven by shaft 52 which is suitably keyed or otherwise fixed for rotation with gear 53; and gear 53 is driven by gear 47.

Figure 20:
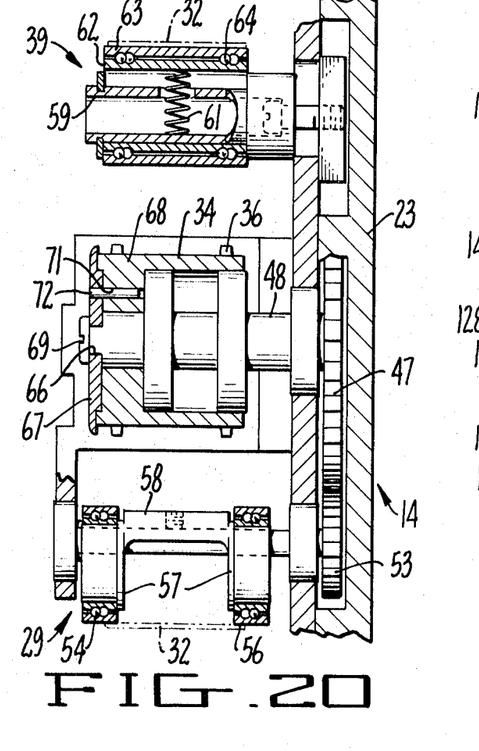
FIG. 20, a view partly in section illustrating the drive elements of the film drive mechanism including the sprocket means, eccentric drive means and compensating drive means.
Figure 21:
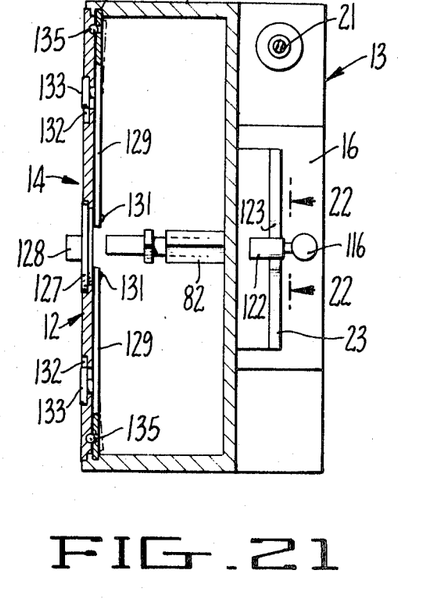
FIG. 21, a sectional view taken substantially in the plane of line 21—21 of FIG. 4 and illustrating a quick disconnect attachment for holding of the two sections of the camera firmly together.
Figure 22:
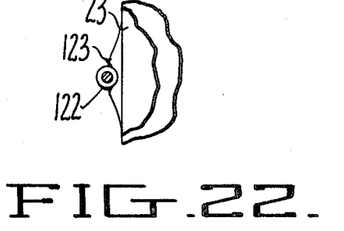
FIG. 22, a fragmentary view of the disconnect fastening element shown in FIG. 21 substantially as seen in the plane of line 22—22 thereof.

The preferred structure of the sprocket 34, eccentrically mounted wheel means 29, and compensating guide-and-wheel means 39 are shown in FIG. 20 together with their mounting in housing 23. As there shown, the eccentrically mounted wheel means 29 comprise a pair of rings 54 and 56 formed to engage and hold the film 32 as film moves thereover during rotation of the wheel means, eccentrically mounted wheel structure 57 carried on shaft 52, and suitable bearings such as balls 58 between the rings 54 and 56 and the inner wheel structure 57. The inner wheel structure 57 is carried directly by fastening to or being integral with the shaft 52, and is suitably counterweighted as at 58 to minimize vibrational forces.

Figure 5:
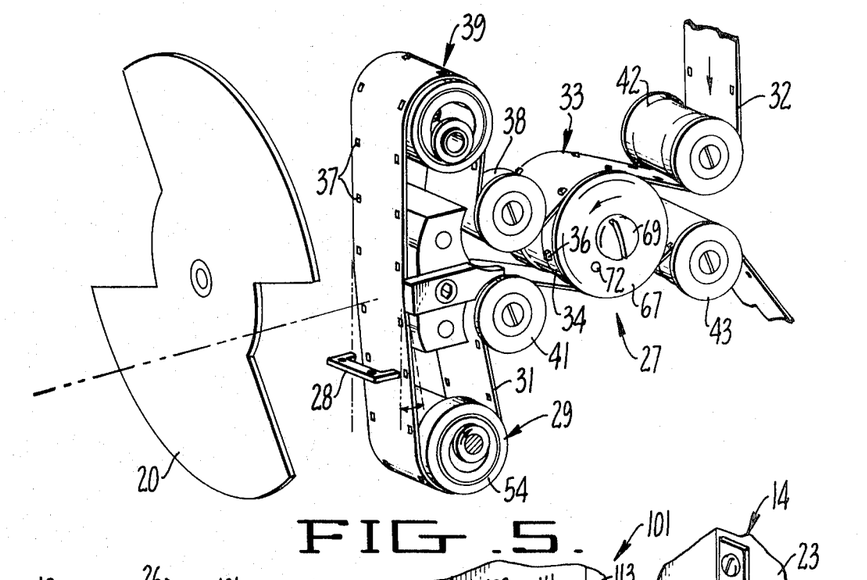
FIG. 5, a perspective view of a portion of the film transport construction of the camera of FIGS. 1 through 4 together with a diagrammatic illustration of the shutter position with respect to the film gate.

It will be noted from FIG. 5 that the film and outer ring structure moves into the opposite direction from the inner wheel structure. Thus, as shown in FIG. 5, eccentrically mounted wheel means 29 pulls the film outward and downward and then over toward the registration pin 28 as it moves upward. In the structure here shown, compensating guide-and-wheel means 39 are provided so as to allow the film to be pulled downward by the eccentrically mounted wheel means 29, and otherwise compensate for the movement thereof. It will be appreciated that the eccentrically mounted wheel means 29 is formed to pull the film downward, and then hold it in a substantially stationary position for a period of time as the eccentric goes back toward the original pulldown position. As the film is pulled down, the compensating means 39 allows for the pulldown through a spring mechanism, and then takes up slack during the substantially hold or stationary position of the film so as to get ready for the next pulldown operation, all is more clearly set forth in FIGS. 9 through 12.

Referring again to FIG. 20, it is seen that the compensating guide-and-wheel means 39 comprises a central stub shaft 59 formed to carry a spring 61 therein which in turn biases a ring or sleeve 62 in the upward direction as shown in the FIGURE. Carried on the ring 62, is a suitable roller 63 adapted to support the film 32 and to roll over the ring 62 through suitable bearings such as ball bearings 64.

Figure 9:
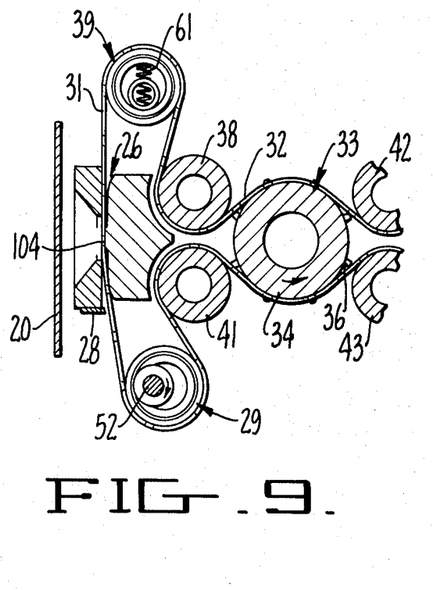
FIG. 9, an elevational view of a portion of the film drive mechanism illustrating the manner in which the film passes through the film gate, with certain of the parts being shown in section.

FIGS. 9 through 12 illustrate the operation of the eccentrically mounted wheel means 29 and compensating guide-and-wheel means 39 in their action of bringing the portion of the loop 31 of film 32 into a stop-and-go motion as the film goes through the film gate 26. Referring first to FIG. 9, it is seen that the eccentrically mounted wheel means 29 is rotating so as to pull the film loop in a downward direction, and the compensating guide-and-wheel means 39 is in a position where the spring 61 thereof is beginning to compress. It should be noted that the shutter 20 is in position to close off the aperture so that the film is not being exposed, and that registration pin 28 is out of engagement with the film 32. Sprocket wheel 34 is rotating as indicated by the arrow thereon so as to push the film into the upper portion of the loop, but at a velocity which does not equal the downward pull on the section 31 through the film gate.

Figure 10:
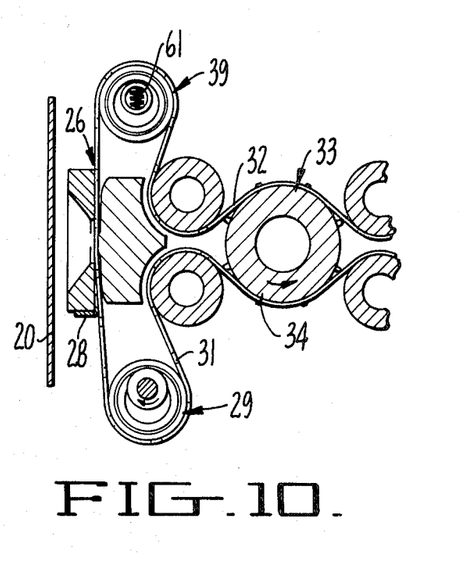
FIG. 10, a view similar to FIG. 9, but illustrating a different position during the cycle of advance of the film through the film gate.

FIG. 10, shows a position when the eccentrically mounted wheel means 29 has reached its bottom position and stopped pulling loop 31 through the film gate in this position, the spring 61 of the compensating guide-and-wheel means 39 is compressed, and the loop 31 is displaced at its maximum distance downward. It should be noted, that the film is pulled away from the loop to the bottom side of the sprocket 34 at the same time it is advanced toward the loop 31 by the upper portion of sprocket 34, so that the length of film in the loop remains constant at all times. It should be noted also, that the film is still not engaged in registration pin 28, but that the eccentrically mounted wheel means is moving the lower portion of the loop toward the eccentrically mounted wheel means so that engagement will occur as the eccentrically mounted wheel means moves another 30 degrees.

Figure 11:
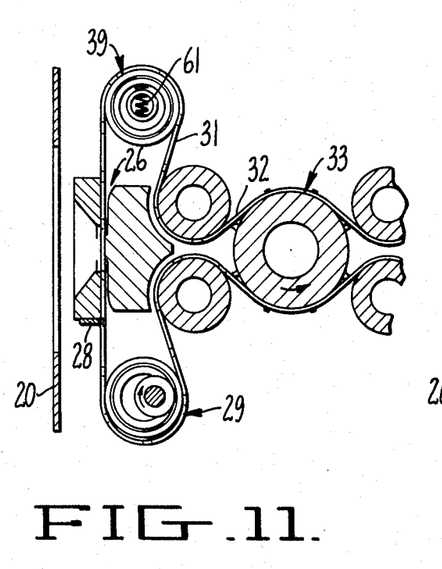
FIG. 11, a view similar to that in FIGS. 9 and 10 but illustrating a third film position during its cycle.

FIG. 11 shows the eccentric in the third quadrant position and 30 degrees after the film has been engaged with registration pin 28. In this position, the film is held absolutely stationary by the pin, while moving a substantially constant velocity over sprocket 32 toward the takeup reel and from the supply reel. The eccentrically mounted wheel means 29 is moving toward the slack position, so as to allow the lower portion of the loop end to move toward sprocket 32, and with the proper adjustment, there might even be a slight amount of slack developing at this time by virtue of the fact that the eccentrically mounted wheel means allows more loop payout than is taken up by the sprocket. At the same time, the upper portion of the loop 31 is being enlarged by film being fed from the supply reel through sprocket 32 toward the loop. This film is taken up by the relaxing of spring 61, which pushes the compensating guide wheel means 39 upward as the film is played out so as to keep the loop substantially out of slack at the upper end thereof. During this position, the film section in the film gate is held stationary and exposure takes place; the shutter 20 being in the exposure position as shown.

Figure 12:
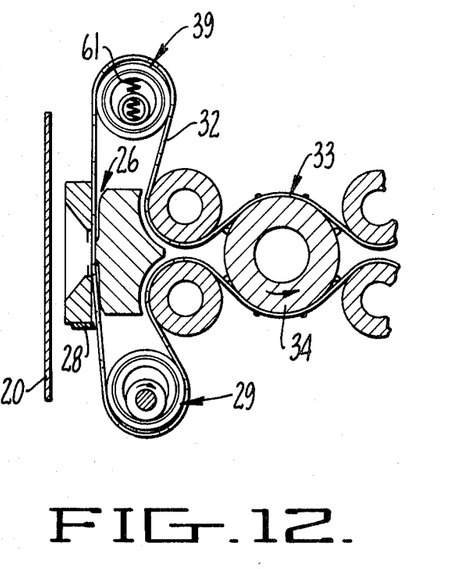

FIG. 12 shows a final quadrant position of the eccentrically mounted wheel means 29, where the film is being now moved laterally away from the registration pin 28 and disengages same. The wheel means 29 is also at its upper most position and slight slack will probably be present in the film loop around this wheel. By the same token, spring 61 of the compensating guide-and-wheel means 39 has extended upward to the limit allowed by the wheel means therein, and some slack may be allowed in the upper position also. The provision of slight slack is to prevent undue tension being placed on the film when the loop is in the position shown in FIG. 10, but it should be appreciated that the slack should be sufficiently minimal that no jerking or such tendency should occur that will break the film. From FIG. 12, where the film slides off the registration pin, windup begins by sprocket reel 34 and this windup is accelerated as the cycle continues back to FIG. 9 position by virtue of the eccentrically mounted wheel means 29 moving upward and bringing the lower end of the loop upward.

From the foregoing procedure, it is seen that the portion of the loop 31 passing through the film gate is moved in alternate stop-and-go motion, with the stop period being say about one-third of the cycle and the go movement being about say two-thirds of the cycle. It is also seen that reciprocating motions are minimized, and registration pin movement is completely eliminated. On the other hand, the registration pin is active during the halting period to positively hold the film during the entire exposure thereof.

Thus it is seen that the novel film drive system of this invention provides for a rapid stop-and-go movement with inertial forces minimized, and it is also seen that it not only causes the film to move in stop-and-go fashion through the film gate, but also moves the film toward and away from the registration pin in positively synchronized fashion.

Figure 23:
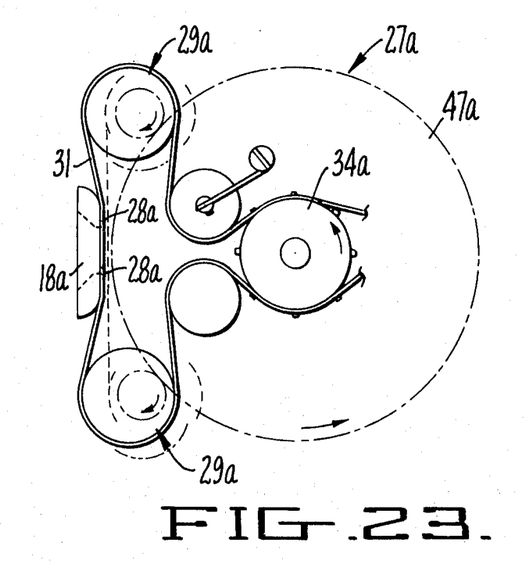
FIG. 23, a diagrammatic view of an alternate film drive mechanism utilizing the broad principles of the film drive mechanism of this invention.

While the preferred form shows the eccentrically mounted wheel means 29 for the positive drive aspect of moving the film loop in stop-and-go fashion and causing engagement and disengagement of the registration pin, it will be appreciated that two eccentrically mounted wheel means could be used, one being used in place of the compensating guide and wheel means 39, if desired. In addition, it will be appreciated that a registration pin could be placed on the upper side of the film gate as well as the lower side where the upper wheel means is eccentrically mounted. An example of such alternate form is shown in FIG. 23.

As there shown, film drive means 27a comprises a sprocket 34a driven by a gear 47a diagrammatically indicated, and with certain other parts (not shown) similar to the film drive means 27 herein shown and described. The drive means 27a comprises an eccentrically mounted wheel means 29a at the bottom thereof and in driving engagement with gear 47a as in the other embodiment, and a second eccentrically mounted wheel means 29a at the top thereof, also being in direct drive with gear 47a. These eccentrics are in opposed relationship so that when the lower eccentric wheel means brings the film loop 31 down, the upper eccentric wheel means also brings the film loop downwardly a compensating amount, similarly both act to bring the film loop upward, in effect, when the film loop is stationary at the aperture 18a. Two sets of registration pins 28a are provided, said registration pins engaging film holes on each side of the exposure areas, with each registration pin being engaged and disengaged as the film is moved laterally by the juxtaposed eccentrically mounted wheel means 29.

From the foregoing description it is seen that certain of the structures such as a single eccentrically mounted wheel means acting in cooperation with the registration pin provides the basic idea of the invention, but that considerable structures may be provided within the scope of the invention, all of which are more fully defined by the claims attached hereto.

Referring again to FIGS. 5 and 20, it will be appreciated that the sprocket 34 must be synchronized with the registration pin 28, that is, the holes of the filmstrip 32 must engage in registration pin 28 in proper fashion while also being carried on the sprocket 34. In order to achieve and properly make this adjustment, it is preferred to make sprocket 34 as shown in FIG. 20 where shaft 48 is provided with a square shoulder 66. A disc 67 is then provided with a matching square hole and fit over square shoulder 66 of shaft 48, and against the main body 68 of sprocket 34. A screw 69 is provided for holding an initial adjustment, but is not dependent on to hold the final adjustment. With the film passed through the film gate and the film loop in place on the sprocket, the sprocket is adjusted to receive the holes of the filmstrip as the registration pin 28 properly engages the holes of the filmstrip. When the desired sprocket position is obtained, a hole 71 is bored through the disc 67 and main body 68, and a pin 72 driven in place. This proper adjustment is then provided in permanent fashion so that synchronizism is positively maintained. It will be appreciated that other methods of providing synchronized adjustment may be utilized, however, this system is excellent in achieving an exact synchronization, which will remain after factory adjustment and not be disturbed by the user.

Returning again to FIG. 13, it is seen that the present invention also provides an apparatus for moving a strip of film longitudinally from the supply reel 44 through the film gate 26 and to a takeup reel 51, with the apparatus having means for driving the supply reel in rotary motion, and having a drive clutch system 73 interposed in driving relation between the supply reel and the takeup reel. The drive clutch 73 comprises a gear drive train 74 tending to drive from the supply reel to the takeup reel at a multiplied speed of rotation, and the slip clutch 76 interposed in said gear drive train operable to allow the drive of said supply reel to drive the takeup reel at a reduced speed of rotation. In this way, by a combination of multipled drive together with slippage, the overall drive ratios between supply reel and takeup reel are achieved between the two extreme values required.

As shown in FIG. 13, supply reel 49 is driven by the positive drive on sprocket 34 acting to pull filmstrip 32 over guide rollers 77, 78, and 79 and off of the takeup reel. In other words, the film provides the power coupling between sprocket 34 and supply reel 49 so as to positively drive supply reel 49 as indicated by the arrow 81 thereon. Supply reel 49 is carried on a square shaft 82 which is fit for rotation therewith and transmits the rotation of supply reel 49 to gear 83. Gear 83 then driving gear 84 in a four-to-one rotational increase, gear 84 then driving gear 86 which in turn drives pulley 87. Pulley 87 drives pulley 88 through a wirelike belt 89 which is tensioned to drive when possible but slip when resisted. Pulley 88 then causes round shaft 91 to rotate therewith, the round shaft being journaled through square shaft 82 and squared at its end 92 where it fits into and rotates with takeup reel 51. It will be seen that takeup reel 51 will rotate as long as there is sufficient film 32 available from sprocket 34, but cannot move any faster than sprocket 34. Accordingly, when the takeup reel 51 tries to drive faster than required to take available film, the slip clutch mechanism 76 is operative to provide for a positive takeup without undesirable overdrive.

While a wirelike pulley is shown for the slip clutch, it will be appreciated that any standard slip clutch device may be utilized which is capable of continued operation, and which will provide the desired combination of slipping and positive drive tension required for the camera construction.

Figure 2:
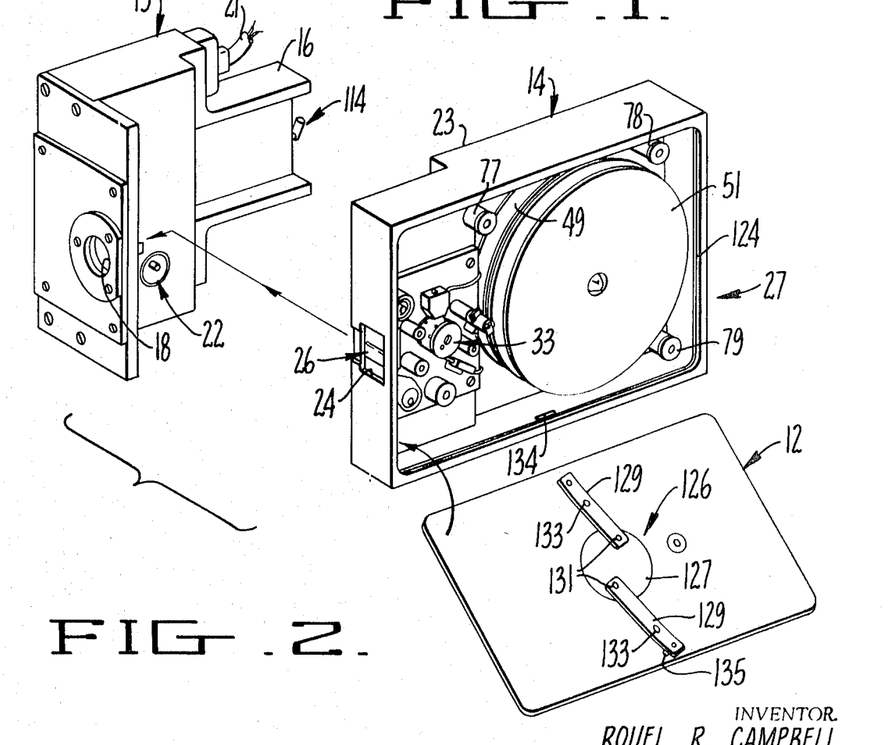
FIG. 2, an exploded perspective view of the camera of FIG. 1, showing the cover removed and the two camera sections separated from one another.
Figure 3:
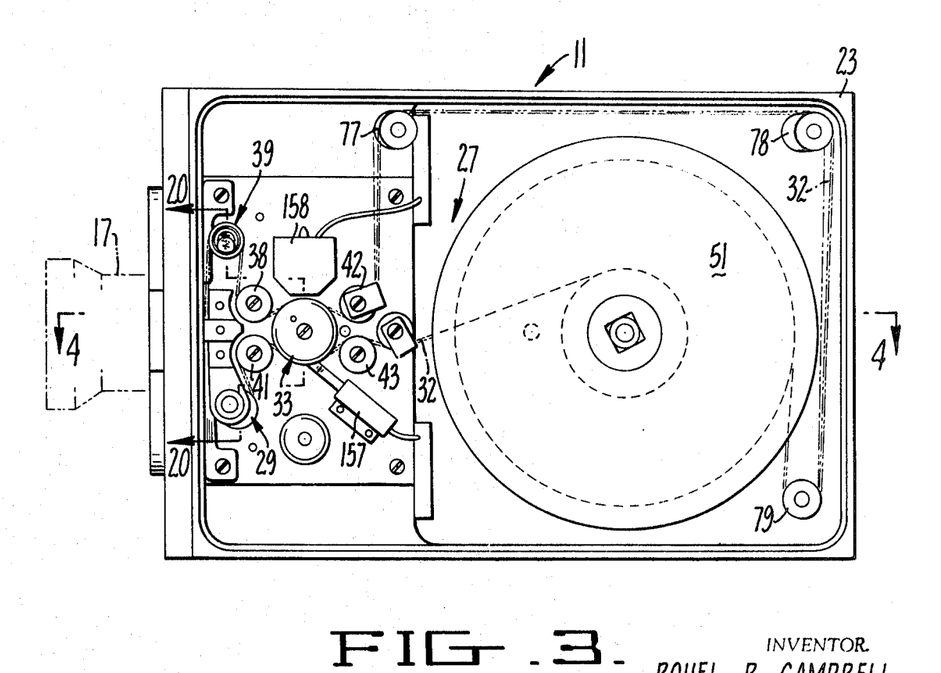
FIG. 3, a side elevational view of the camera shown in FIG. 1, with the cover removed for better illustration of internal parts.
Figure 4:
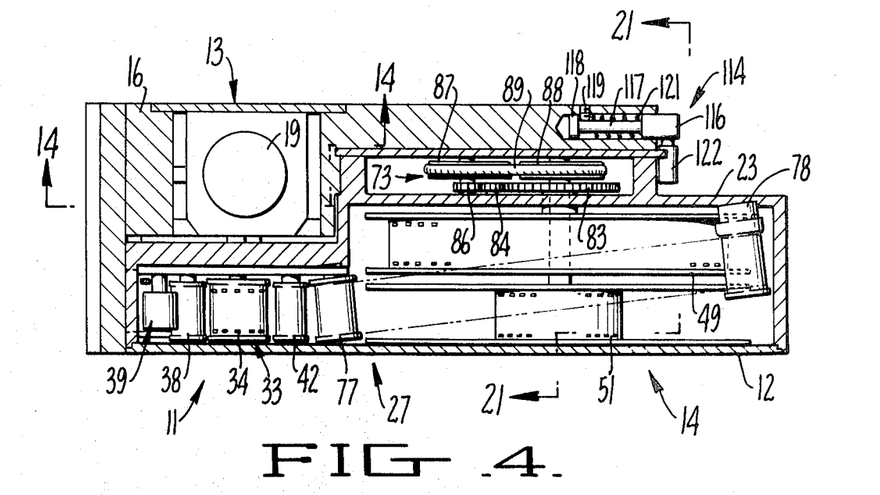
FIG. 4, a sectional view of the camera shown in FIG. 3 taken substantially in the plane of line 4—4 thereof.

As shown in FIGS. 2 and 4, the camera is divided into two main detachable sections 13 and 14. It will be seen, that all of the film and associated drive means are carried in section 14, with the exception of the main motive power source operating through power-coupling means 22. In this way, the section 13 can be permanently mounted on an aircraft or the like, if desired, and rapid film changes may be effected by substituting sections 14. On the other hand, ordinary film changes can be effected by opening the door 12 and unloading and reloading the film in section 14. In order to achieve a rapid change by swapping sections 14, it is important that the new section 14 with the film already positioned for exposure be carried in proper focus so that continued exposure may take place with minimum loss of time. This is achieved by having the objective lens, shutter, and part of the film gate mounted in the main section 13, and constructing the section 14 so as to provide the rest of the film gate and positively position the new strip of film in an exact equivalent depth as was occupied by the prior strip. In addition to achieving this accurate preservation of film position in the film gate, the two section film gate of this invention also provides for a substantially zero clearance, and an excellent novel gate construction.

Thus the preferred form of the invention also provides a novel film gate comprising guide means 101 formed with a width corresponding to the width of the film in the location of the aperture and for holding the film in a flat configuration thereof. Typical movie film tends to bow so that the emulsion side will be in a cylindrical concavity, and the film gate of this invention tends to flatten out this bowed structure so as to provide a more planar presentation of the film at the exposure position.

As here shown, the guide means comprise a first guide 102 adapted to abut the filmstrip section which is in exposure position on one side thereof and a second guide 103 adapted to abut the film on the side opposite the first guide, said first guide having a surface extending laterally across the film on the side of the film opposite the aperture 18 with the abutting surface 104 thereof defining a plane parallel to the plane of the second guide surfaces, the film strip being at least about as thick as the distance between parallel planes defined by the guide surfaces.

The first guide 102 is in the form of a block having the flat surface 104 for backing up the film and bevelled-off surfaces so as to provide the generally convex face behind the film as best seen in FIG. 5. The block is mounted in the housing 23 of section 14 so as to be spaced in a precision manner from the opening 24 provided in the same housing. The first guide 102 also has a lug 106 fastened on one side thereof for the purpose of interlocking with the second guide and for providing a lateral limit for the film. Mounted on the housing 23, and on the opposite side from lug 106, is a leaf spring 107 extending generally in the direction of film travel and yieldable so as to cooperate with lug 106 and provide an exact side-by-side spacing abutting the filmstrip, which bears against the leaf spring for final adjustment. Thus the filmstrip passes over guide 102 as indicated in FIG. 5, with its rear or nonemulsified surface sliding over the surface 104 of guide 102 and its edges abutting lug 106 on one side and spring 107 on the other.

The second guide means is carried in the housing 16 of section 13 and suitably attached thereto with the second guide means 103 having aperture 18 built in. Guide 103 comprises a flanged side 108 having a notch 109 built therein for receiving the lug 106 and cooperating therewith to form a complete edge abutting means for the filmstrip. The second guide 103 also has surfaces 111 adapted to abut the emulsion side of the film, but only at the edge thereof where no emulsion is present. Centrally located in the surfaces 111 and at the side of the aperture 18, is a cutaway 112 positioned to lie directly opposite the abutting surface 104 of the first guide 102. In this way, the second guide bears against the edges of the film on the emulsion side before and after the film passes by the aperture with the first guide 102 bearing behind the film at the aperture and laterally across the same. The result is that these guide means cooperate to flatten the film out at the exposure position and provide a flat exposure plane therefore together with exact positioning of the film, but without causing the binding of the film that would be provided if the members were disposed exactly opposite one another. The second guide means also has a vertical recess 113 formed therein to prevent contact with the emulsion of the film as the film is guided through the film gate.

Figures 6, 7, 8:
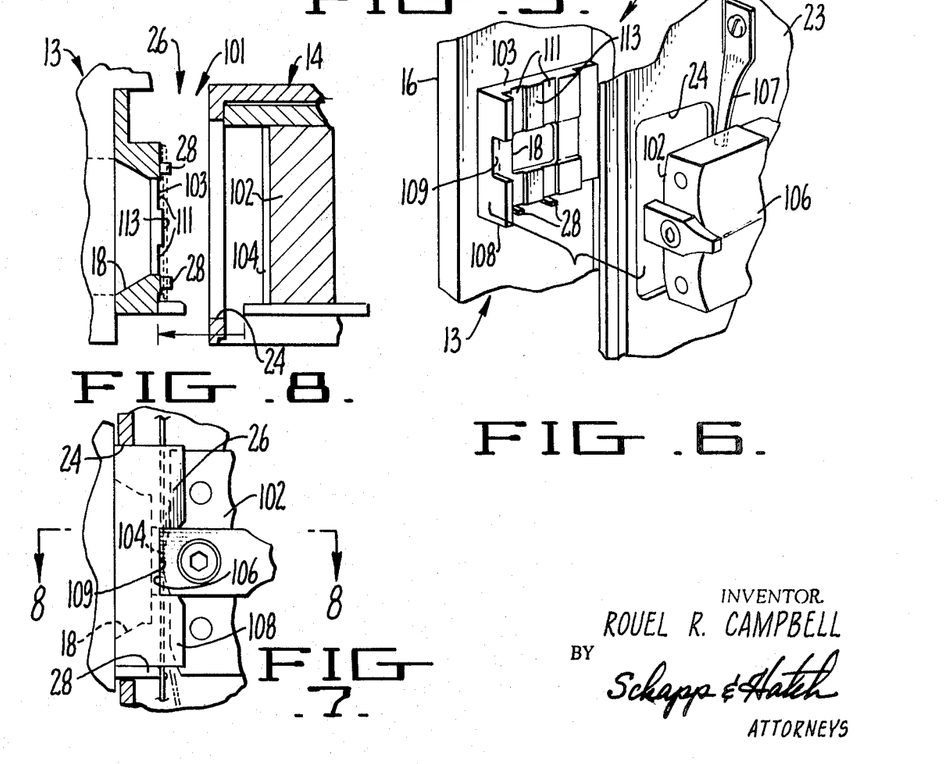
FIG. 6, a fragmentary perspective view of the two sections of the camera including portions of the film gate in each section illustrating the manner in which the film gate is assembled on coupling of the two sections.
FIG. 7, a fragmentary side elevational view of the film gate shown in FIG. 6, but with the camera assembled in operative position.
FIG. 8, a cross-sectional view of the film gate taken substantially in the plane of line 8—8 of FIG. 7, but with the two sections in disassembled condition as illustrated in FIG. 6.

As shown in FIGS. 6, 7 and 8, the registration pin 28 (shown as a separate unit in FIG. 5) is attached to the second guide 103 so as to be permanently fixed to the housing. Since the second guide 102 spaces the exposure side of the film, and this is fixed to housing 16 which in turn holds the objective lens and so forth, the exposure plane defined by the film is fixed even when sections 14 are interchanged. It should also be noted that window 24 is sized to fit clear around the second guide 103 so that the window together with the lug provides an accurately fixed registration of the two sections at the film gate. Coupling of the two sections together is then provided by a fastener 114 located at the rear end of section 13 as shown in FIGS. 2, 4, 21 and 22.

As best seen in FIG. 4, the fastener 114 comprises a generally L-shaped member 116 having the long arm 117 of the L anchored at its end 118 by a suitable holding device such as setscrew 119, a tension spring 121 biased to pull member 116 inwardly, and the short end 122 of the L being formed to engage a slot 123 built into the housing 23 of section 14. With this construction, section 14 is added to section 13 by fitting the window and film gate together as indicated above, bringing the two sections together as shown in FIG. 4, rotating and extending member 116 against spring 121 until it finds its position in slot 123 as shown in the drawings. In this way, quick assembly, and by reverse fashion, quick disassembly of the two sections may be easily effected.

Figure 1:
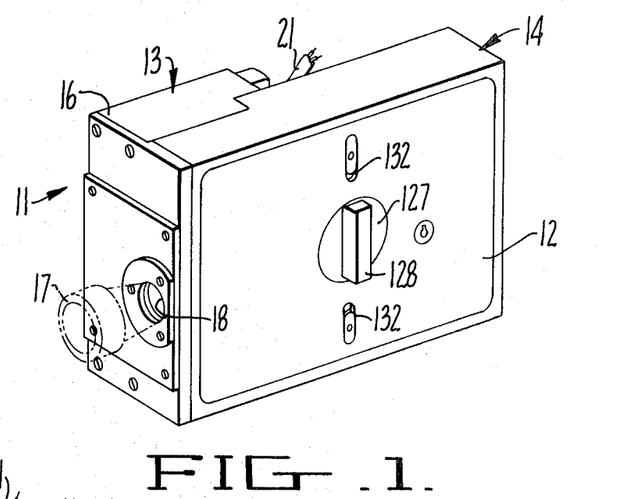
FIG. 1 is a perspective view of a typical movie camera incorporating various features of the invention in the preferred form thereof.

The preferred camera constructed according to this invention is also provided with an access door for effecting film changes in the usual manner. As shown in FIGS. 1 and 2, the door 12 is formed to encompass substantially the entire side opening of section 14 so that the takeup and supply reels may be easily changed, and the film threaded around the appropriate guide means and sprocket. The door 12 is formed to fit into suitable recesses 124 of housing 23 so as to fully shield the inside of the camera from external light, with the recess providing restraint against lateral movement in all directions except the directly outward direction.

In order to restrain the door against outward movement, latch means 126 is provided. As here shown, the latch means comprises a member 127 mounted for rotation and equipped with a handle 128, a pair of leaf spring latches 129, attached to member 127 at their internal ends 131 and directed outwardly on rotation of member 127 by guide slots 132 and associated pins 133, and a pair of retaining recesses 134 formed in housing 23. Ball detents are provided under the leaf spring latches to allow the springs to urge the door against the housing and thereby secure it tightly. On opening, the balls urge the springs outward for easy retraction.

Figure 17:
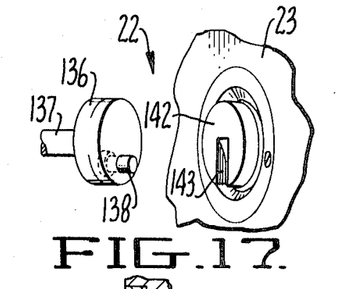
FIG. 17, a perspective view of the mating driving and driven parts of the two main sections whereby rapid coupling may be obtained while retaining synchronization and without binding.
Figure 18:
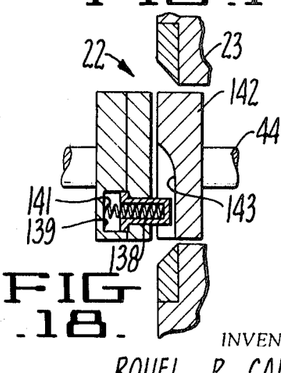
FIG. 18, a sectional view of the drive elements illustrated in FIG. 17.

As indicated above, the sections 13 and 14 are assembled simply by putting them together, and no special manipulation is required to assemble the power-coupling means 22 which couples the power from the motor 19 in section 13 to the film drive means 27 in section 14. In order to achieve this automatic coupling, without binding, a novel coupling device has been provided as shown in detail in FIGS. 17 and 18.

This coupling means comprises a drive member 136 fixedly mounted on shaft 137, which in turn receives power from motor 19 through a suitable direct drive, with the shaft 137 and drive 136 being suitably journaled within section 13 and in fixed position with respect thereto other than a rotational motion provided. Drive member 136 is equipped with a pin 138 offset from the center, with a spring 141 mounted in a suitable chamber 139 from which it is yieldably urged outwardly by spring 141. In other words, pin 138 is free to move inwardly against spring 141 so as to yield on assembly of parts 13 and 14, but with the spring operative to force the pin outwardly for automatic engagement when the proper synchronized driving position is reached.

Power coupling means 22 also comprises a driven member 142 carried on shaft 144, and suitably mounted for rotation within housing 23 of section 14. The driven member 142 is provided with a slot 143 formed to receive pin 138 of drive member 136. Accordingly, when the sections are put together, both the drive member and the driven member are disposed in their proper relationship to each other, but the spring 141 is compressed so as to force drive pin 139 out of the way, unless the assembly happens to be in proper synchronized position. As soon as the drive member 156 is rotated a sufficient fraction of rotation, spring 141 urges the pin 138 into engagement within the slot 143 so as to couple the drive member with driven member and transfer rotation on the drive member to shaft 44. With the pin and slot drive provided, binding which tends to occur on coupling when shafts are not in exact alignment is eliminated. This effect is provided because the pin is free to move radially in shaft a slight amount, if necessary, to compensate for any slight nonalignment that is likely to occur in even the most carefully precision made devices.

Referring again to FIG. 13, it is seen that the driven member 136 receives power from motor 19 through a direct drive and that the shutter 20 also receives power through a direct drive. In this way, the shutter rotation is positively synchronized with the action of the film drive means so as to expose each frame of film when it is in stationary position, and to block off the film during the movement of successive frames into exposure position. Any suitable shutter system may be utilized, provided this synchronization is provided for, and the embodiment shown herein is merely exemplary of a preferred construction utilizing direct gear drives.

Figure 14:
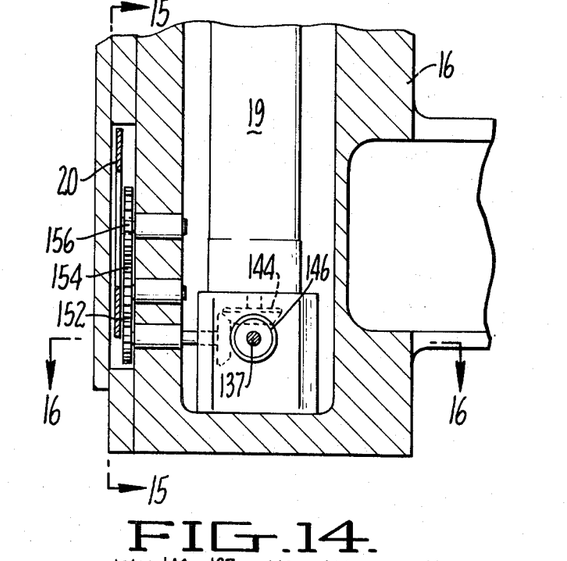
FIG. 14, a fragmentary sectional view through the drive section illustrating certain of the drive gears utilized and as seen substantially in the plane of line 14—14 of FIG. 4.
Figure 15:
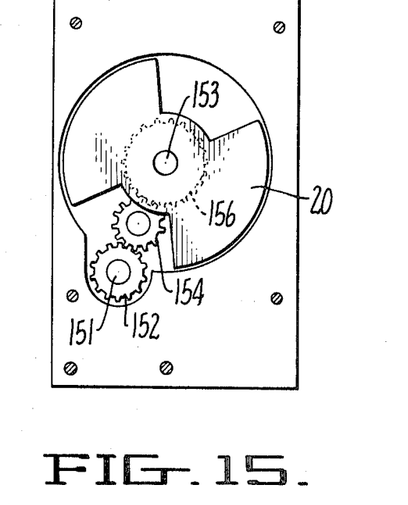
FIG. 15, a view illustrating the shutter drive mechanism as seen substantially in the plane of line 15—15 of FIG. 14.
Figure 16:
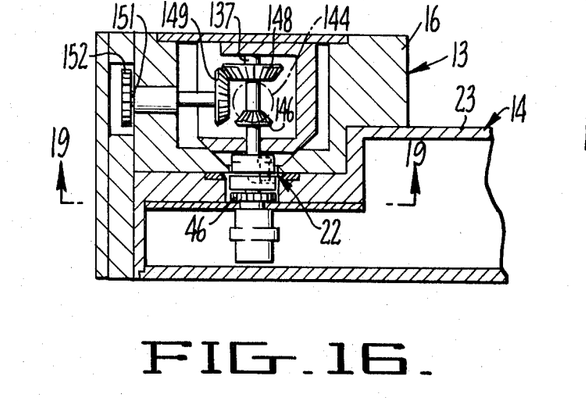
FIG. 16, a sectional view of a portion of the drive mechanism as seen in the plane of line 16—16 of FIG. 14.
Figure 19:
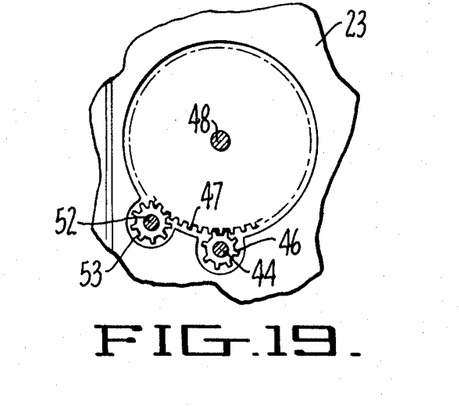
FIG. 19, a view illustrating another section of the drive mechanism substantially as seen in the plane of line 19—19 of FIG. 16.

FIG. 13 shows gears diagrammatically, FIGS. 14 through 16 show the assembly of the various gears and parts in section 13, and FIG. 19 shows a typical assembly of gears from coupling means 22 to the sprocket gear 47 in section 14. Thus FIG. 19 shows the shaft 44 carrying gear 46 on a short shaft with the gear 46 in engagement with large gear 47 that is attached to the sprocket 34. Gear 53 is shown for taking power off of the gear 47 and driving the eccentrically mounted wheel means 29, also referred to as the beater drive, of this invention.

The gear chain from motor 19 to drive member 136 of coupling means 22 comprises a bevelled drive gear 144 driven by the armature of motor 19 and in engagement with bevel gear 146 which is mounted on shaft 137. Shaft 137 carries the drive member 136 and drives the film drive means therefrom. Shaft 137 also carries a bevel gear 148, which drives a bevel gear 149 mounted on shaft 151, which shaft also carries gear 152. The gear 152 drives shaft 153 of shutter 20 through gears 154 and 156, the gears being appropriately located to assure the desired direction of shutter rotation and positively provide a synchronous rotational velocity. FIGS. 14 through 16 illustrate a compact mounting for these gears in which suitable bearings are provided in order to assure low friction and obtain a compact and reliable device. However, it will be appreciated that various designs can be made within the objectives set forth and obtained by the present invention.

Other parts may be added which are desirable in movie cameras in accordance with conventional construction. For example, a cutoff switch 157 and a timing light 158 (see FIG. 3) are preferably provided.

From the foregoing description, it is seen that I have provided a motion picture camera having an improved film drive means together with other improved components.

I claim:

1. Apparatus for preventing lengthwise movement of a strip of film having a series of holes along one side thereof while a picture is being taken, comprising a registration pin mounted in a fixed position for engagement with the holes and for holding the film stationary when the hole is so engaged, and film drive means for advancing the film in progressive stop-and-go movement, said film drive means comprising an eccentrically mounted wheel means positioned for contacting the filmstrip and moving the same laterally back and forth thereby causing the moving film to periodically engage and disengage the registration pin, said eccentrically mounted wheel means being movable in a direction of rotation opposite to the linear movement of the film carried thereover for facilitating the positioning of the film on the registration pin.

2. Apparatus as defined in claim 1, and in which said film drive means contains suitable guide means for forming a loop configuration in a portion of the strip of film for said engagement and disengagement of the film with the registration pin, and in which said eccentrically mounted wheel means is formed for moving said loop configuration upward and downward as well as laterally back and forth for providing a substantial stop-and-go movement of the film in the areas of the registration pin.

3. Apparatus as defined in claim 1, and in which said film drive means also comprises a compensating guide and wheel means for cooperating with said eccentrically mounted wheel means to move the entire loop configuration in an up-and-down fashion.

4. In an apparatus for moving a strip of film lengthwise in stop-and-go fashion through a film gate, said film having a series of holes along one side thereof;

a film drive means, comprising a sprocket means formed to engage the film through said holes at two positions of said path on each side of the film gate, guide means for directing the film through a path extending from a supply means through the film gate to a film receiving means, a registration pin mounted in a fixed position relative to said film gate for engagement in the holes in said film, a sprocket drive means for driving said sprocket at a substantially constant speed, said guide means having an eccentrically mounted wheel means positioned for contacting the film in said path between said sprocket means and said film gate and formed for causing the film moving toward said eccentrically mounted wheel means in a substantially uniform velocity to move from said eccentrically mounted wheel means in a stop-and-go motion, with one of the holes in said film being engaged on said stationary pin while the film is in a stop condition.

5. Apparatus as defined in claim 4, and in which said film drive means also comprises a compensating guide and wheel means positioned on the side of said film gate opposite said eccentrically mounted wheel means and between said film gate and said sprocket means.

6. Apparatus as described in claim 5, and in which said compensating guide and wheel means comprises a freely rotating ring yieldably urged away from said eccentrically mounted wheel means.

7. Apparatus as defined in claim 6, and in which said eccentrically mounted wheel means is driven in synchronous fashion with said sprocket drive means, but in an opposite direction of rotation.

8. In an apparatus for moving a strip of film lengthwise in stop-and-go fashion through a film gate, said film having a series of holes along one side thereof; a film drive means comprising a sprocket formed to engage said film through said holes, guide means for guiding the film along a path from a film supply means past said sprocket through the film gate and again past said sprocket to a film-receiving means whereby the film forms a loop having each loop end engaging the sprocket and a central portion thereof passing through the film gate, a registration pin mounted in a fixed position along said path for intermittent engagement with the holes in the film when the latter is moved toward said registration pin, said guide means including an eccentrically mounted wheel means positioned for contacting the loop portion of the film in the path between said sprocket means and the film gate and formed for causing the filmstrip moving toward said eccentrically mounted wheel means in a substantially uniform velocity to move away from said eccentrically mounted wheel means in a substantially stop-and-go fashion, said eccentrically mounted wheel means being formed for intermittently urging the film toward said registration pin.

9. Apparatus as defined in claim 8, and in which said registration pin is mounted at the film gate for holding the film absolutely stationary therein when said registration pin is engaged in one of the holes.

10. Apparatus as defined in claim 9, and in which said film drive means also comprises a compensating guide and wheel means positioned on the side of the film gate opposite said eccentrically mounted wheel means and between the film gate and said sprocket means.

11. Apparatus as defined in claim 10, and in which said compensating guide and wheel means comprises a freely rotating ring yieldably urged away from said eccentrically mounted wheel means.

12. Apparatus as defined in claim 10, and in which said eccentrically mounted wheel means comprises a counterweighted eccentric crank element, and a ring rotatably mounted on said crank element.

13. Apparatus as defined in claim 12, and in which said eccentrically mounted wheel means is driven in synchronous fashion with said sprocket, but in an opposite direction of rotation.

* * * * *